United States Patent [19]
Struttmann

[11] 3,773,397
[45] Nov. 20, 1973

[54] SELF-ALIGNING BEARING ASSEMBLY

[75] Inventor: Hilarius S. Struttmann, St. Charles, Ill.

[73] Assignee: Borg-Warner Corporation, Chicago, Ill.

[22] Filed: June 29, 1972

[21] Appl. No.: 267,305

[52] U.S. Cl. ............................................. 308/194
[51] Int. Cl. .......................................... F16c 23/08
[58] Field of Search ................... 308/194, 72, 207, 308/214, 29

[56] References Cited
UNITED STATES PATENTS
2,166,391  7/1939  Borland ............................ 308/236

Primary Examiner—Charles J. Myhre
Assistant Examiner—Frank Susko
Attorney—Donald W. Banner et al.

[57] ABSTRACT

A self-aligning bearing assembly having a sealed lubricated bearing in which the bearing is constructed of an inner race means, spaced roller bearing assemblies, and a multiple piece outer race means. The outer race means presents a spherical outer surface. The housing can be a casting with an opening to receive the bearing and is formed with a pair of spaced, spherical surfaces, each being generated by an arc the radius of which has a center offset in two directions from the geometric center of the opening. The spaced, spherical surfaces are located opposite the zones of roller bearing contact with the inside of the outer race.

8 Claims, 10 Drawing Figures

SELF-ALIGNING BEARING ASSEMBLY

BACKGROUND OF THE INVENTION

Roller bearing assemblies are well known in the art. There are several types of housings for receiving roller bearings. Housings can be pillow blocks, flange housings and the like. One assembly is the "fixed" type in which the bearing is substantially fixed in position. Such a unit is capable of handling only a slight shaft misalignment. One great advantage of these units is the generally compact constructions which contains relatively few parts. They thus require only a minimum of space. Another variety of assembly accommodates greater misalignment of the shaft. These are known as "self-aligning" types. Usually, self-aligning assemblies are more complex, larger, requiring more space, and require a greater number of parts.

THE INVENTION

According to this invention, there is provided an improved roller bearing assembly with a replaceable, sealed, lubricated roller bearing, the assembly of bearing and housing being fully self-aligning and of relatively simple construction, permitting its use where the relatively small, fixed position prior art housings are now being used. While the bearing is generally pre-lubricated at the factory, it is constructed to be re-lubricated when necessary or desirable.

The bearing comprises an inner race, two groups of tapered rollers, spaced from each other, and an outer race. The face of the inner race is generally cylindrical, to receive a shaft, with an outside configuration comprising two, spaced, conical runways. The rollers of each group comprise a plurality of truncated conical rollers equally spaced in a circle. A roller retainer or cage is provided for each group of rollers, the roller retainer or cage fitting between the races in such a way as not to impede rotation or revolutionary movement of the rollers. The outer race can be made in two parts centrally joined together, each part having at its inside surface a truncated conical runway disposed to receive the rollers of one of the two aforesaid groups in theoretical line contact, and each part having at its outer surface a truncated spherical configuration whose center falls at a point at the geometric center of the outer race when the two parts are joined together. They are welded or otherwise joined together.

The housing may comprise a pillow block casting and may be (1) a split block in which the housing is split along a plane projecting substantially through the center of the opening and parallel to the base of the block, or (2) one containing a substantially spherical seat formed in one side of the block, the other side of the block being bored substantially cylindrically to a diameter larger than the largest diameter of the sphere of the bearing with the gap between the side of the substantially spherical surface of the bearing being filled by a separate adaptor ring having an inside diameter to fit the bearing and an outside diameter to fit the block.

In an event, the pillow block casting, regardless of its configuration, and in assembled form, has an opening for receiving a bearing, which opening is formed with a pair of spaced, truncated spherical surfaces opposite to the rollers of the bearings. Each truncated spherical surface is generated by an arc, the radius of which has a center offset in two directions from the geometric center of the opening. The radius of each arc is the same; their centers are spaced from each other; the radii cross one another on a plane passing centrally through the block and perpendicularly to the center line of the opening.

The two truncated spherical surfaces are joined by a central truncated spherical surface of revolution generated by an arc having a radius differing from the radii of the aforementioned spaced surfaces, so that there is formed a relief chamber or a space between the block and the bearing. This chamber retains lubricant and is primarily provided so that the bearing will not be loaded at this location.

THE DRAWINGS

DETAILED DESCRIPTION

Figure 1:
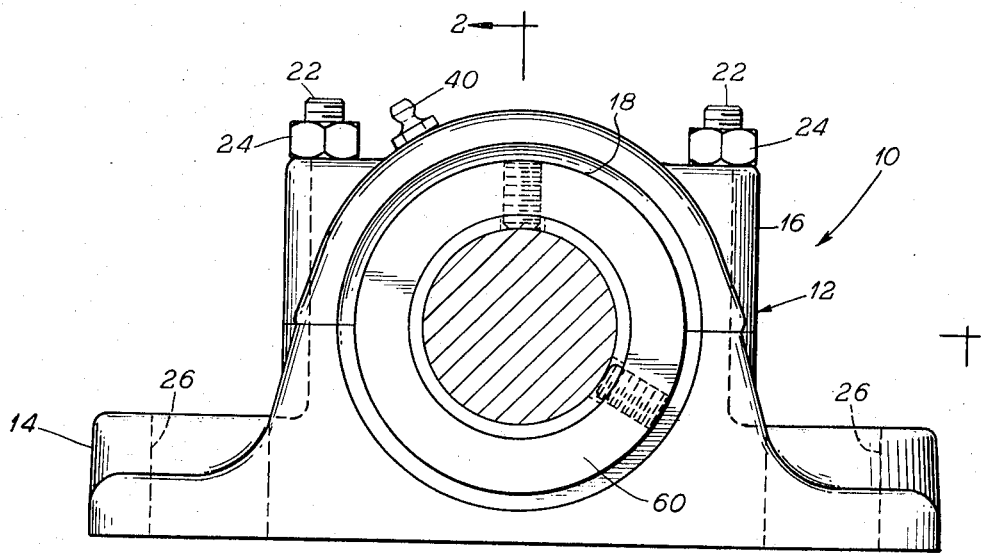
FIG. 1 is an elevation of a split pillow block-bearing assembly made according to this invention.

FIGS. 1 to 4 inclusive illustrate a split pillow block bearing assembly, generally identified as 10 in which the block 12 comprises a base 14 and a top or cover 16, the block 12 being split along a plane projecting substantially through the center of an opening 18 for the roller bearing generally identified as 20. The top or cover 16 is bolted to the base 14 by bolts 22 extending from the base 14 and tightened down by suitable nuts 24.

The base 14 has elongated openings 26 for receiving bolts (not shown) by which the pillow block is fastened to a surface, the elongated openings permitting sidewise adjustment of the position, as is necessary and desirable, for the particular installation. To remove and replace a roller-bearing 20, the top 16 is removed, the old bearing 20 is lifted out, the new bearing is placed in the base 14, and the top 16 is replaced and bolted to the base 14.

Figure 4:
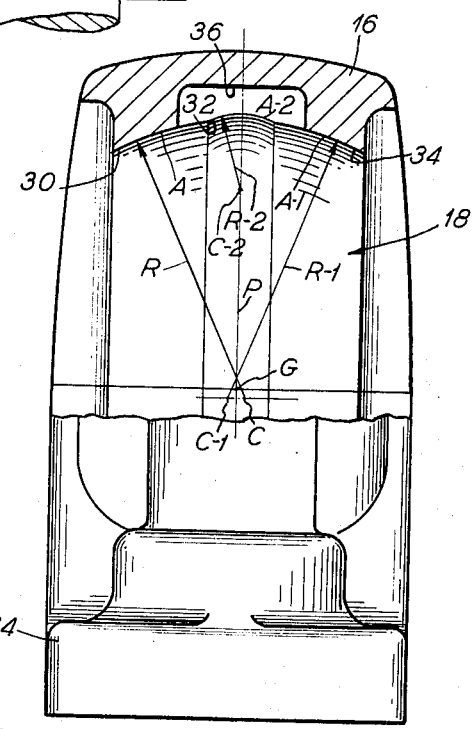
FIG. 4 is a sectional view similar to FIG. 2 of the pillow block of the assembly of FIG. 1 without the bearing.
Figure 5:
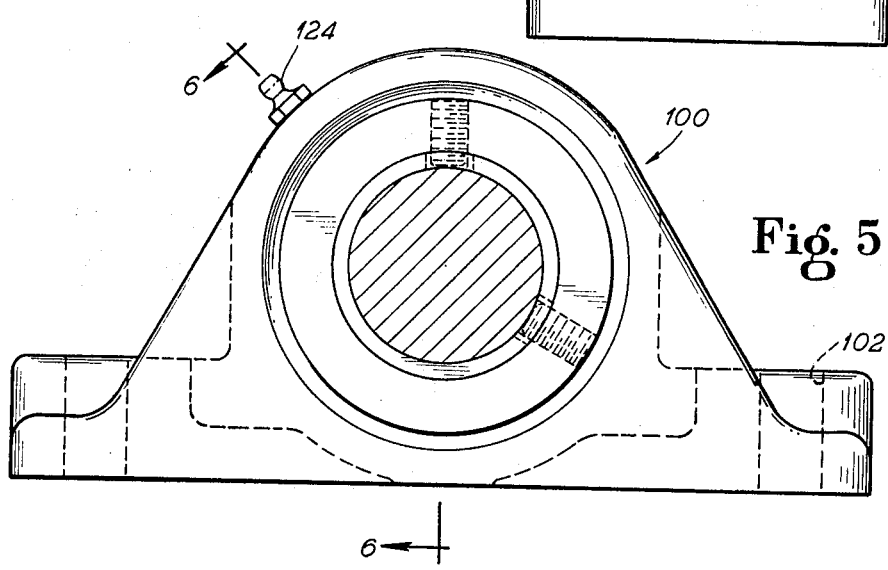
FIG. 5 is an elevation of another embodiment of the pillow block-bearing assembly made according to this invention.

The pillow block 12 is generally a metal casting with machined inside surfaces defining the opening 18, as will now be described. Reference is especially made to FIG. 4 of the drawings. In the block being described, there are three truncated, spherical surfaces of revolution 30, 32, and 34, the surfaces 30 and 34 being spaced by the surface 32. The surfaces 30 and 34 are mirror images; a description of one surface will apply to the other. The surface 30 is generated by an arc A, the center C of the radius R of which is offset in two directions from the geometric center G of the block 12. An inspection of FIG. 4 will show that the center of the radius R of the arc A generating the surface 30 lies at C; thus the center C traverses a circular path about the longitudinal center line of the opening 18. The circular path is in a plane parallel to plane P passing through the geometric center G, which plane is perpendicular to the longitudinal center line. This circular path is on the side of the plane which is adjacent to the surface 34. Likewise, the surface 34 is generated by a similar arc A-1, the center C-1 of the radius R-1 of which is offset on two directions from the geometric center G of the block 12. The radius R and R-1 are equal. Thus the center C-1 lies on the opposite side of the plane P, and the circle traversed thereby when the surface 34 is generated is on the side of the plane which is adjacent to the surface 30.

The surface 32 is generated by an arc A-2, the radius R-2 of which has its center C-2 in the plane P. The radius R-2 is less than the radii R, R-1; its center C-2 traverses a circle lying in the plane P.

The top or cover 16 of the block is cored or provided with a circular opening 36 located at the upper portion of the block between the surfaces 30 and 34 to receive a locking pin on the bearing (to be described), so as to prevent rotation of the bearing in the block. The top of the casting is drilled to receive a threaded grease fitting 40 which communicates with the space 32.

Figure 2:
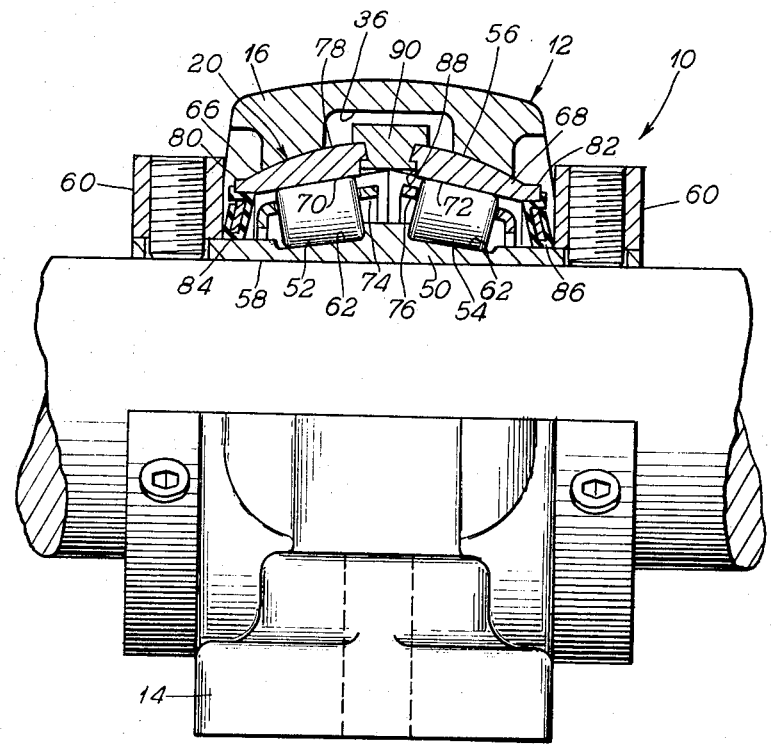
FIG. 2 is a sectional view taken on line 2—2 of FIG. 1.
Figure 3:
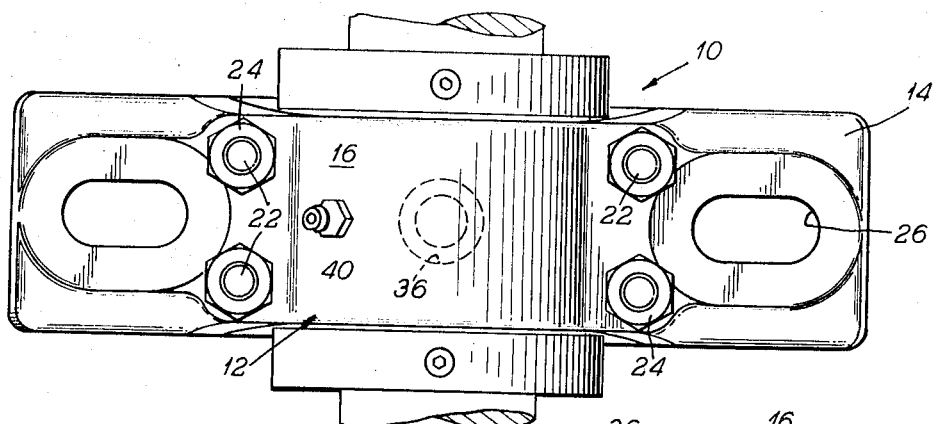
FIG. 3 is a plan view of the assembly of FIG. 1.
Figure 6:
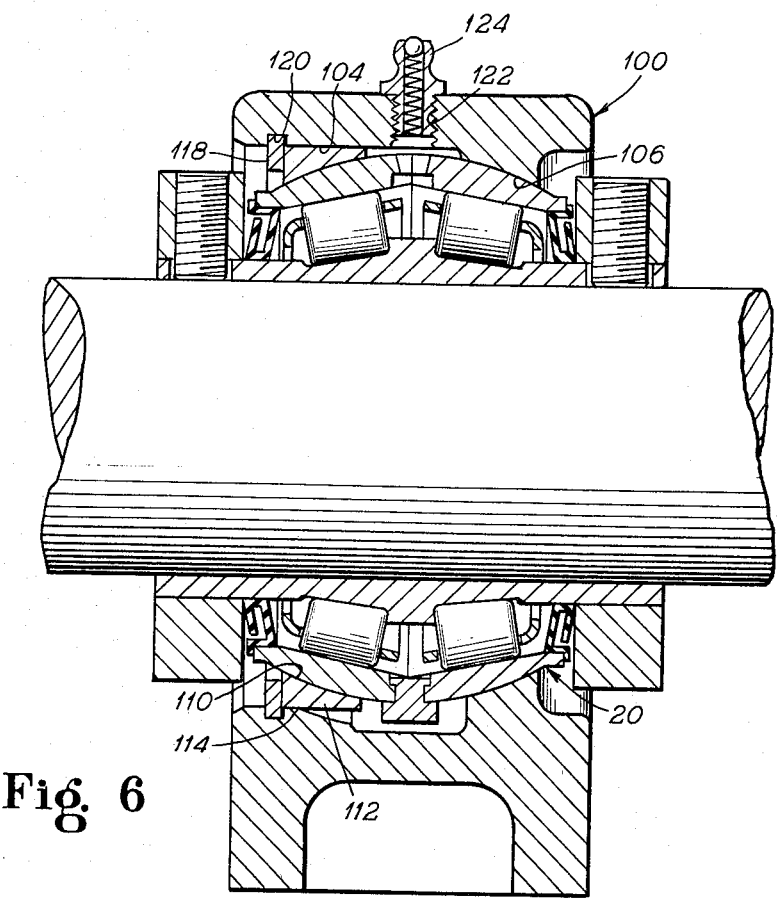
FIG. 6 is a sectional view taken on line 6—6 of FIG. 5.
Figure 7:
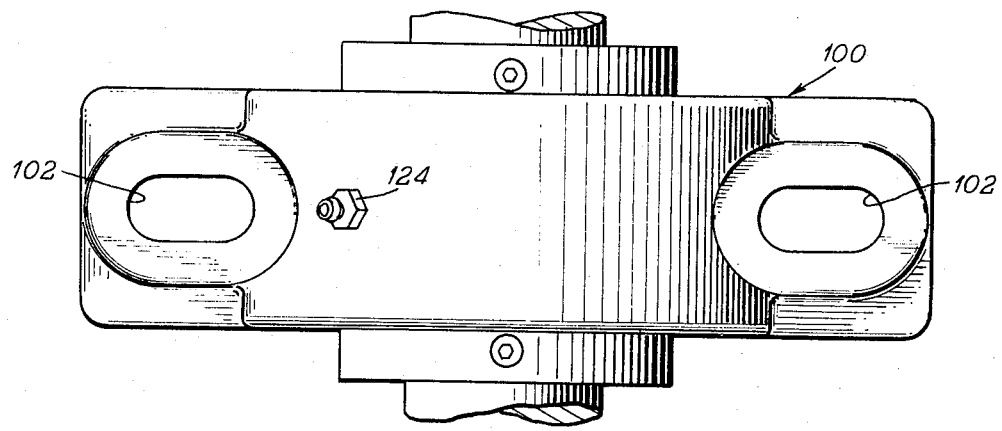
FIG. 7 is a plan view of the assembly of FIG. 5.
Figures 8, 9:
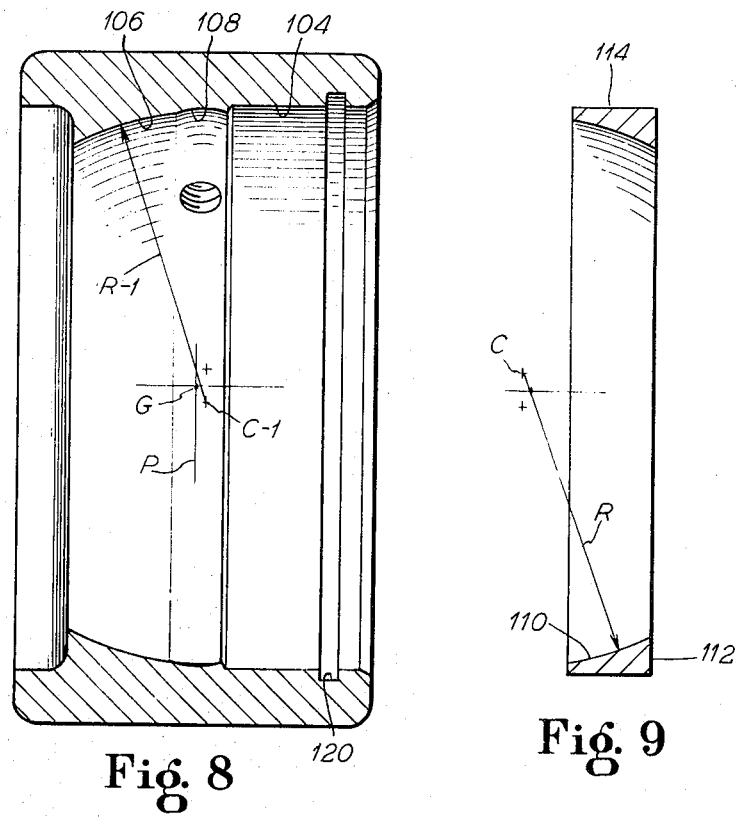
FIG. 8 is a central sectional view of the pillow block of the assembly of FIG. 5 without the bearing and adaptor ring.
FIG. 9 is a sectional view of the adaptor ring of the pillow block in the FIG. 5 embodiment.
Figure 10:
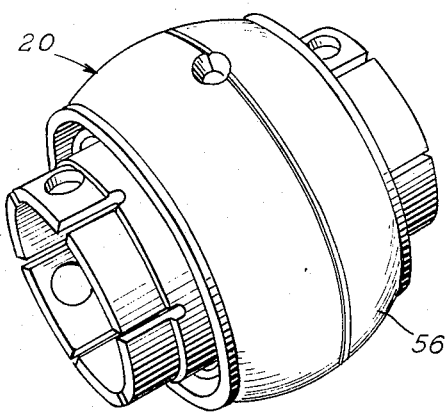
FIG. 10 is a perspective view of the roller bearing usable in the embodiments of FIGS. 1A and 5.

The roller bearing 20 is shown in FIGS. 2, 6, and 10; it is the same for each form of pillow block. (The structure of the pillow block shown in FIGS. 5, 6, 7, 8 and 9 will be described later). The bearing 20 comprises an inner race member 50, two groups of tapered rollers 52 and 54, and an outer race member 56. The inner race member 50 is generally cylindrical with a cylindrical opening 58 to receive a shaft. At the ends of the inner race member 50 are locking means 60 by which the shaft is locked in its desired position. The locking means 60 may be of any accepted and known types; FIG. 2 shows these to be constructed as collars which receive set screw to engage the shaft. The extremities of the inner race which receive the locking collars may be slit longitudinally so that the extensions can be caused to grip the shaft.

The inner race member is machined to provide two, spaced, conical runways 62 for the rollers 52, 54, respectively.

The outer race member 56 is made in two parts or pieces 66, 68, centrally joined together, as by welding, with the inner surfaces forming truncated conical raceways 70, 72 disposed to contact the group of rollers 52, 54 respectively. Each group of rollers is provided with a roller retainer or cage 74, 76, the roller retainers or cages fitting between the races in such a way as not to impede rotation or revolutionary movement of the rollers. The major portion of the outer surface 78 of the outer race member 56 is of spherical configuration; the parts 66 and 68 are joined at their geometric center. Each outer race part terminates in a cylindrical lip 80, 82 and a lubricant seal 84, 86 is provided at the ends of the bearing, the seals being disposed or located between the cylindrical lips and the inner race member 50. While the lips 80 and 82, and lubricant seals 84, 86 are herein illustrated and described, such parts are not essential to the structure. To lubricate the bearing one or more openings 88 are provided in the outer race member 56. A locking pin 90 is held captive between the outer race parts and fits into the cavity or opening 36 to present rotation of the bearing in the block.

To insert or replace a bearing in the split pillow block 12 of the FIG. 1-4 embodiment is a simple matter requiring disassembly and/or assembly of the block parts.

Turning now to the embodiment illustrated in FIG. 5 to 9, inclusive, there is illustrated a pillow block 100 having elongated openings 102 by which the pillow block can be mounted on a surface. These openings correspond to openings 26 in the FIG. 1 to 4 embodiment. The pillow block 100 is provided with an enlarged circular opening 104 which opens into a substantially spherical cavity defined by a truncated spherical surface of revolution 106. The surface of revolution 106 corresponds to the surface of revolution 34 in the FIG. 1-4 embodiment and is generated in a similar manner using a radius R-1, the center C-1 of which is offset in two directions from the geometric center G of the pillow block. Between the surface of revolution 106 and the opening 104, there is a surface of revolution 108 which corresponds to the surface of revolution 32 in the FIG. 4 embodiment. The surface of revolution 108 is formed in the same manner as the surface of revolution 32 in the previous embodiment. To provide a surface of revolution 110, which corresponds to the surface of revolution 30 in the previous embodiment there is provided an adaptor ring 112 (see FIG. 9). The surface of revolution 110 is generated by a radius R having a center C which, when the adaptor ring 112 is seated in the cavity 104, is offset in two directions from the geometric center of the pillow block. The adaptor ring 112 is provided with an outer cylindrical surface 114 to seat in the cavity 104 in engagement with the arcuate surface 106 and is inserted in the opening 104 after the bearing 20 (which is identical with that earlier described) is seated against the surface 106. A locking or snap ring 118 received in a groove 120 locks the bearing 20 and the adaptor ring 112 in position. By selecting a thickness of locking or snap ring 118, the loading on the bearing can be selected. In a manner similar to the previous embodiment, the pillow block is bored, as at 122 to receive a grease fitting 124 which communicates with 108.

To replace a bearing 20 in the pillow block of FIGS. 5 to 9, the locking collars 60 are removed, freeing the shaft. After the shaft is removed, the snap ring 118 is removed, the adaptor ring 112 is removed, and the bearing 20 removed. A new bearing is inserted, followed by a reversal of the steps just described.

In each of the embodiments just described shaft misalignment can occur without misalignment, deformation, or displacement of the lubricant or oil seals 84, 86; here the inner and outer races move as a unit. As will be noted, the inner spaced spherical surfaces of the pillow block casting are located opposite the zones of roller bearing contact with the raceways of the outer race.

While the drawings illustrate types of pillow blocks as the bearing housing, it is to be understood that other types of housings, for example, flange housings, can be used without departing from the spirit of the invention.

What is claimed is:

1. A self-aligning bearing assembly comprising;
   a roller bearing having an outer-spherical surface;
   and a housing having an opening to receive said bearing;
   said housing opening having spaced accurate surfaces of revolution engaging said outer spherical surface of said bearing;

each spaced accurate surface of said housing opening being generated by an arc having a radius the center of which is offset from the center line of said opening and from a plane perpendicular to said center line;

said plane passing through the center of said opening.

2. A self-aligning bearing assembly as recited in claim 1 in which said center of said radius traverses a circular path located in said plane when generating said arc.

3. A self-aligning bearing assembly as recited in claim 2 in which said bearing comprises an inner race member adapted to receive a shaft, an outer race member, and rollers between said race members, the outer race member having said outer spherical surfaces, and rollers being located opposite to each of the accurate surfaces of revolution.

4. A self-aligning bearing assembly as recited in claim 3 in which said outer race member is constructed of two pieces centrally joined together.

5. A self-aligning bearing assembly comprising;
a roller bearing having an outer spherical surface; and a housing having an opening to receive said bearing;
said housing opening having spaced arcuate surfaces of revolution engaging said outer spherical surface of said bearing;
each spaced arcuate surface of revolution of said housing opening being generated by an arc having a radius the center of which is offset in more than one direction from the geometric center of said opening.

6. A self-aligning bearing assembly as recited in claim 5 in which the center of said radius is offset in two directions from the geometric center of said opening.

7. A self-aligning bearing assembly as recited in claim 6 in which said bearing comprises an inner race member adapted to receive a shaft, an outer race member, and rollers between said race members, the outer race member having said outer spherical surface and the rollers being located opposite the accurate surfaces of revolution.

8. A self-aligning bearing assembly as recited in claim 7 in which said outer race member is constructed of two pieces centrally joined together.

* * * * *